United States Patent [19]
Nussbaum et al.

[11] Patent Number: 5,390,651
[45] Date of Patent: Feb. 21, 1995

[54] AIR/FUEL RATIO CONTROLLER FOR LARGER INTERNAL COMBUSTION ENGINES

[75] Inventors: Stephen H. Nussbaum, Temecula; Bradford A. Lessard, Santee, both of Calif.

[73] Assignee: Precision Engine Controls Corporation, San Diego, Calif.

[21] Appl. No.: 145,391

[22] Filed: Oct. 29, 1993

[51] Int. Cl.⁶ .............................................. F02M 7/00
[52] U.S. Cl. .................................................... 123/694
[58] Field of Search ............. 123/694, 672, 676, 679, 123/699, 480, 510, 511, 696; 60/274; 364/431.06, 571.07; 324/509

[56] References Cited

U.S. PATENT DOCUMENTS

| | | | |
|---|---|---|---|
| 3,561,407 | 2/1971 | Foreman et al. | 123/41 |
| 3,814,072 | 6/1974 | Gillespie | 123/179 L |
| 3,832,846 | 9/1974 | Leeson | 60/39.28 R |
| 4,087,961 | 5/1978 | Avery | 60/39.28 R |
| 4,117,857 | 10/1978 | Van De Mark | 137/117 |
| 4,132,165 | 1/1979 | Leeson | 102/49.8 |
| 4,262,844 | 4/1981 | Sekiya | 236/48 R |
| 4,295,602 | 10/1981 | Priesmeyer | 236/93 |
| 4,471,738 | 9/1984 | Smojver | 123/440 |
| 4,590,576 | 5/1986 | Elpiner | 364/510 |
| 4,596,264 | 6/1986 | Gladstone et al. | 137/85 |
| 4,716,723 | 1/1988 | Ralston et al. | 60/39.281 |
| 4,751,907 | 6/1988 | Yamamoto et al. | 123/694 |
| 4,831,838 | 5/1989 | Nagai et al. | 60/274 |
| 4,867,125 | 9/1989 | Grevemeyer | 123/694 |
| 4,926,825 | 5/1990 | Ohtaka et al. | 123/694 |
| 4,939,658 | 7/1990 | Sekozawa et al. | 364/431.06 |
| 5,109,817 | 5/1992 | Cherry | 123/272 |
| 5,111,653 | 5/1992 | Leeson | 60/39.02 |
| 5,140,535 | 8/1992 | Raff et al. | 364/571.07 |
| 5,222,022 | 6/1993 | Adams et al. | 364/431.07 |
| 5,230,322 | 7/1993 | Curran et al. | 123/694 |
| 5,253,632 | 10/1993 | Brooks | 123/696 |
| 5,298,865 | 3/1994 | Denz et al. | 324/509 |

*Primary Examiner*—Raymond A. Nelli
*Attorney, Agent, or Firm*—Noel F. Heal

[57] ABSTRACT

Apparatus, and a corresponding method for its operation, for controlling the air/fuel ratio in a large engine having one or more banks of cylinders with separate intake and exhaust manifolds. Oxygen sensors in the manifolds are sampled periodically to provide the apparatus with an indication of the level of oxygen, and therefore an indication of the level of various pollutants, in exhaust gases discharged from the engine. The apparatus, preferably in microprocessor form, computes a fuel control correction based on the difference between the sensed oxygen level and a desired oxygen level in each exhaust manifold. The correction is applied in the form of a change to the pulse width of a binary control signal applied to a solenoid valve. In the illustrative embodiment, the solenoid valve is coupled to a fuel pressure regulator and functions to vent an air chamber in the regulator when the solenoid is actuated. Changing the pulse width of the control signal varies the average fuel pressure and thereby controls the air/fuel ratio, which in turn corrects the oxygen level in the exhaust manifold. The controller also monitors various temperatures in the engine and selectively disables control of the air/fuel ratio when selected temperatures fall outside assigned limits.

24 Claims, 4 Drawing Sheets

AIR/FUEL RATIO CONTROLLER FOR LARGER INTERNAL COMBUSTION ENGINES

BACKGROUND OF THE INVENTION

This invention relates generally to air/fuel mixture controllers for large internal combustion engines used in industrial applications, such as for power generation and natural gas compression. More particularly, the invention relates to engines of this type that employ gaseous fuel and a carburetor to mix the fuel and air. Recently imposed emission control regulations will require operators of large industrial engines to reduce pollution rates by as much as 90% below current levels. Users of four-stroke engines fueled by natural gas are allowed to treat exhaust gases chemically in a catalytic converter, which converts offending pollutants, such as oxides of nitrogen ($NO_x$), carbon monoxide (CO), and non-methane hydrocarbons, to much less harmful substances: nitrogen, carbon dioxide ($CO_2$) and water ($H_2O$). Unfortunately, converter technology is not always sufficient to effect this conversion, unless the chemical balance of offensive pollutants entering the catalytic converter is maintained at a precise ratio. Maintaining the balance of pollutants entering the converter is effected by controlling the ratio of air to fuel input to the combustion engine.

Typically, the air/fuel ratio is controlled in response to measurement of the concentration of oxygen in the engine exhaust. The fuel pressure is increased or decreased on a continuous basis to maintain the oxygen concentration in the engine exhaust at a selected level corresponding to a desired chemical composition of pollutants in the exhaust gases. Continuously variable control of the fuel pressure requires the use of relatively costly stepper motor valves, and may also require modification of fuel line plumbing, modification of air induction components, and the addition of an external air or gas supply. Therefore, there is a need for a simple, inexpensive, yet convenient and reliable technique for controlling the air/fuel ratio in a large, industrial internal combustion engine. The present invention satisfies this need.

SUMMARY OF THE INVENTION

The present invention resides in a microprocessor-based air/fuel controller for large gas-fueled engines. A key aspect of the invention is its use of a simple solenoid-operated valve that is duty-cycle-modulated to achieve a desired air/fuel ratio without the use of proportionally controlled valves, such as expensive stepper motor valves.

In one of its embodiments, the invention may be defined as air/fuel ratio control apparatus for use with an engine having one or more banks of cylinders with separate intake and exhaust manifolds. Briefly, and in general terms, the apparatus comprises an air/fuel mixer for each bank of cylinders, the mixer having an air inlet and a fuel inlet; a fuel pressure regulator for each bank of cylinders, for controlling the fuel pressure supplied to the fuel inlet of the mixer, in response to pressure changes in an air chamber of the regulator; and a solenoid valve coupled to each fuel pressure regulator. Opening the solenoid valve vents the air chamber and results in a lower fuel pressure supplied to the fuel inlet of the air/fuel mixer. The apparatus further comprises an oxygen sensor installed in the exhaust manifold of each cylinder bank, for generating a signal indicative of the oxygen level in the exhaust manifold; and a controller having means for inputting a desired oxygen setpoint value for each cylinder bank. The controller is responsive to the signals indicative of the oxygen level, and also includes means for generating a solenoid valve control signal for each cylinder bank. The control signal is adjusted in pulse width to control the fuel pressure and flow to achieve the desired oxygen setpoint value.

More specifically, the controller further includes means for periodically reading the signals indicative of the oxygen level; means for averaging a selected number of consecutive oxygen signals, to obtain an average sensed oxygen level for each cylinder bank; means for comparing the averaged sensed oxygen level for each cylinder bank with the oxygen setpoint value for the same cylinder bank and generating an error value from the comparison; and means for applying a correction value, corresponding to each error value, to a duty value indicative of the pulse width of the solenoid valve control signal for each cylinder bank. The pulse width of the control signal is changed in response to the difference between the averaged sensed oxygen level and the oxygen setpoint value. The means for generating the solenoid valve control signal uses the duty value to set the pulse width of the control signal.

The invention may be applied to both turbocharged and naturally aspirated engines. The turbocharged engine has a turbocharger connected to the air inlet of the air/fuel mixer for each cylinder bank, and the fuel pressure regulator has a bias port in its air chamber, connected by a line to the outlet side of the turbocharger. In this configuration, the solenoid valve is connected to vent the line between the bias port and the outlet side of the turbocharger. Application of the solenoid valve control signal opens the valve, vents the air chamber of the regulator, and results in leaner operation of the engine.

In the naturally aspirated engine, the fuel pressure regulator bias port is normally connected to atmospheric pressure. In this configuration, the solenoid valve is connected to vent the bias port to a source of vacuum, such as at the intake manifold. Application of the solenoid valve control signal opens the valve, vents the air chamber of the regulator to vacuum, and also results in leaner operation of the engine. In this version of the apparatus, the bias port is connected to atmosphere through a flow restrictor. The flow restrictor serves to limit and filter the flow of air from atmosphere when the valve is open, but still allows connection to atmosphere when the valve is closed.

The invention may also be defined as an air/fuel ratio controller comprising at least one input circuit, for inputting signals indicative of sensed oxygen level in the exhaust manifold; a control panel, including means for inputting a desired oxygen setpoint value; means for generating a binary fuel control signal having periodic pulses with a controllable pulse width; means for periodically deriving a pulse width correction from the difference between the sensed oxygen level and the oxygen setpoint value; and means for periodically applying the correction to the pulse width. The generated binary fuel control signal effects a change in air/fuel ratio, which tends to move the sensed oxygen level closer to the oxygen setpoint value.

The controller of the invention may also include an additional input circuit, for inputting signals indicative of temperature; and means for discontinuing operation of the controller if the temperature signals are not within a prescribed range. The latter means may include means for disabling the generation of the binary fuel control signal if the temperature in the exhaust manifold is below a selected threshold, or means for disabling the generation of the binary fuel control signal if the temperature of a selected engine component exceeds a selected threshold.

The controller may also include means for averaging a selected number of consecutive sensed oxygen readings, to obtain an average sensed oxygen level for use in deriving a pulse width correction. In addition the controller may also include means for deriving a trend in the sensed oxygen level, from a number of consecutive sensed oxygen readings; and means for selectively disabling the application of a pulse width correction, based on the derived trend in the sensed oxygen level.

In the preferred embodiment of the invention the controller includes a microprocessor; and the means for inputting a desired setpoint value includes a pair of control buttons to initiate display and modification of the setpoint value. The preferred controller also comprises at least one additional input circuit, for inputting signals indicative of sensed oxygen level in a separate exhaust manifold serving a separate bank of cylinders in the engine; means for generating a separate binary fuel control signal for controlling fuel separately supplied to the separate bank of cylinders; means for deriving a pulse width correction from the difference between the sensed oxygen level in the separate bank of cylinders and a separate oxygen setpoint value; and means for periodically applying the correction to the pulse width of the separate binary fuel control signal. Therefore, at least two cylinder banks of the engine can be controlled independently to achieve different target oxygen output levels.

The invention may also be defined in terms of a novel method for controlling the air/fuel ratio in an engine having one or more banks of cylinders with separate intake and exhaust manifolds. Briefly, the method comprises the steps of selecting a desired setpoint oxygen level for each of the exhaust manifolds, the setpoint levels being selected to provide a desired level of pollutants in the exhaust; sensing the oxygen level in each of the exhaust manifolds; generating for each cylinder bank a binary fuel control signal, derived from the setpoint oxygen level and the sensed oxygen level; and applying the binary fuel control signal to a fuel control valve to regulate the flow of fuel. The fuel control valve in an on condition serves to reduce the flow of fuel to the engine, and repeated opening and closing of the valve by the fuel control signal results in adjustment of the air/fuel ratio to conform the sensed oxygen level to the setpoint oxygen level for each cylinder bank.

In the illustrative embodiment of the invention, the step of generating a binary fuel control signal includes computing an oxygen level error based on a comparison of the setpoint oxygen level and the sensed oxygen level; deriving a fuel control correction from the oxygen level error; and applying the fuel control correction to a current value of a fuel control parameter, wherein the fuel control parameter is indicative of the proportion of time that the fuel control valve is to remain in an on condition.

More specifically, the step of generating a binary fuel control signal further includes periodically generating an on signal for application to the fuel control valve; waiting for a time proportional to the current fuel control parameter, after generation of each on signal; and then generating an off signal for application to the fuel control valve.

It will be appreciated from the foregoing that the present invention represents a significant advance in the field of air/fuel mixers for large industrial engines. In particular, the present invention provides a versatile controller that can be easily and inexpensively connected to an existing engine, without the need for proportional controllers or stepper motor valves. The controller handles separate cylinder banks independently and a different oxygen setpoint level may set for each of the banks to optimize pollution control for the entire engine. Other aspects and advantages of the invention will become apparent from the following more detailed description, taken in conjunction with accompanying drawings.

DESCRIPTION OF THE PREFERRED EMBODIMENT

Figure 1:
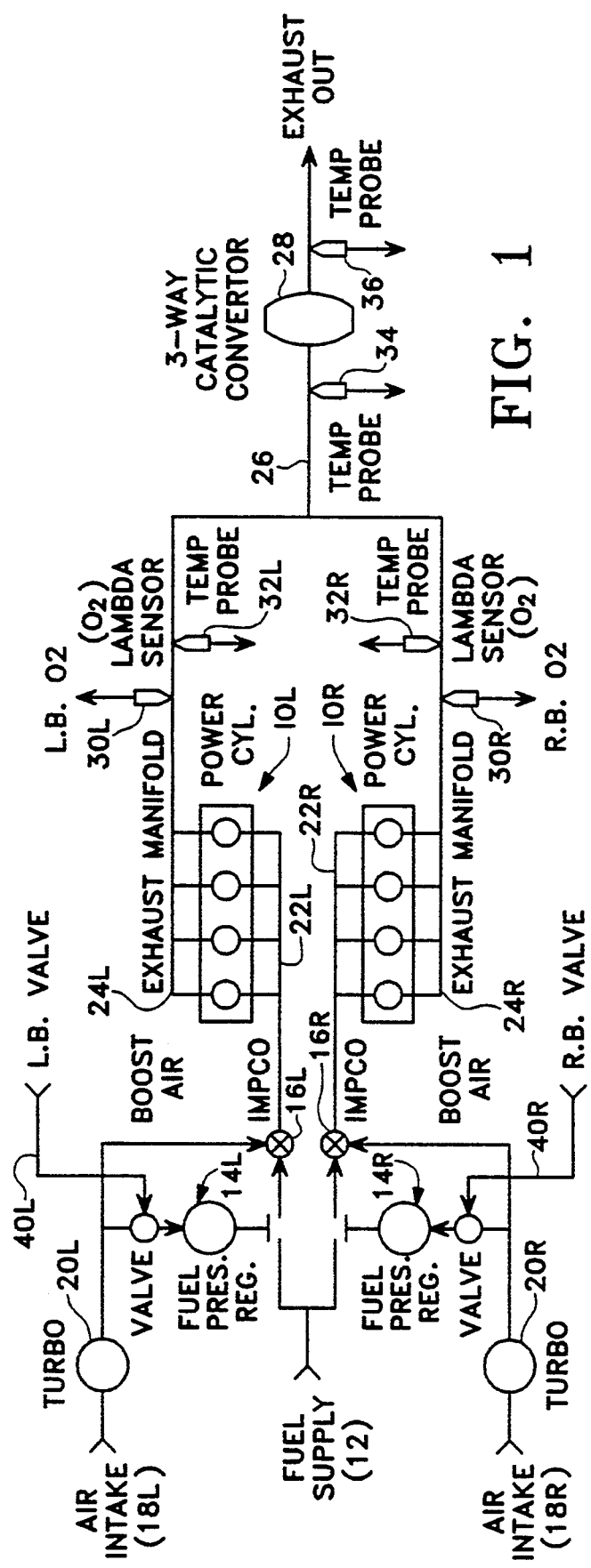
FIG. 1 is a schematic diagram showing the environment of the present invention.

As shown in the drawings for purposes of illustration, the present invention pertains to an air/fuel ratio controller for use in large internal combustion engines fueled by gaseous fuel, such as natural gas. FIG. 1 is a schematic diagram showing the environment of the invention, including portions of a large engine having two banks of cylinders, indicated by reference numerals 10L and 10R. Throughout this specification, the suffixes L and R, or LB and RB, are used to designate the left bank and right bank of cylinders in the engine. In some instances the letters L and R are also used to refer to "lean" and "rich" mixtures of fuel and air, but the meaning will be clear from the context.

Fuel from a fuel supply 12 is split into left-bank and right-bank flow lines, which are controlled by separate fuel pressure regulators 14L and 14R, and connected to separate mixers or carburetors 16L and 16R. Air from intakes 18L and 18R is also input to the respective carburetors. In the illustrative embodiment of the invention, the air pumped into the carburetors by turbo pumps 20L and 20R, but as will be discussed further below, the present invention may also be used in a naturally aspirated engine, i.e. one that is not turbocharged.

The fuel and air mixture is drawn into the cylinders 10L, 10R through intake manifolds 22L and 22R. Exhaust gases from the cylinders leave through exhaust manifolds 24L, and 24R, which merge into a single exhaust line 26. The exhaust gases are processed by a three-way catalytic converter 28 before being vented to atmosphere.

The oxygen content of the exhaust gases is sensed by sensors 30L and 30R in the respective exhaust manifolds 24L and 24R. Temperature probes 32L and 32R sense the temperature of gases in the exhaust manifolds 24L and 24R, and two additional temperature probes 34 and 36 sense the temperature of exhaust gases at the inlet and outlet ports of the catalytic converter 28.

The function of air/fuel ratio control is usually effected by controlling the fuel pressure regulators 14L and 14R to vary the fuel pressure to maintain a desired 02 concentration in the exhaust gases. In the past, this has involved using a proportionally controlled valve of some kind in the fuel pressure regulator, and a stepper motor to vary the valve position to maintain the desired fuel flow. Prior control systems of this type have employed a single control loop for both banks of cylinders.

In accordance with the present invention, fuel pressure for the left and right banks of cylinders is controlled independently in the two fuel pressure regulators 14L and 14R, and without the need for relatively expensive stepper motors or continuously variable valves. How the invention achieves this goal will be described in more detail, after introducing the microprocessor controller 38 of the invention.

Figure 2:
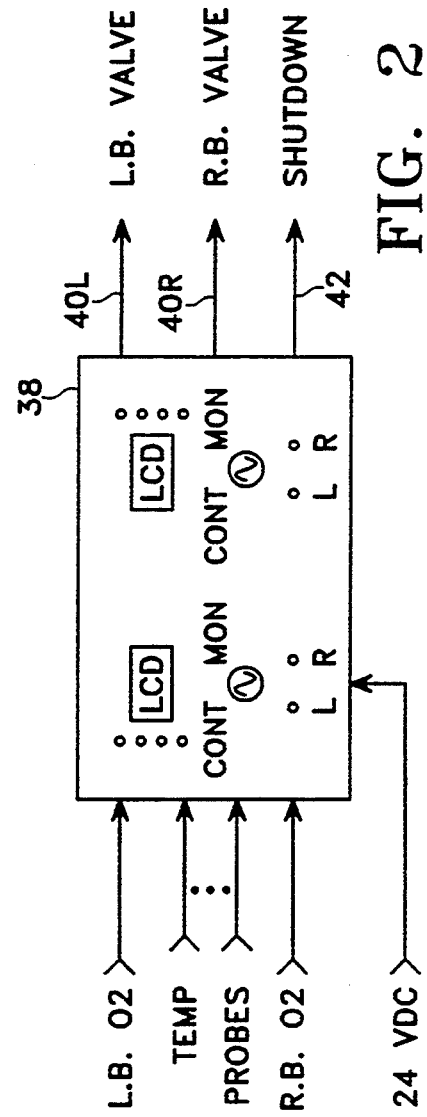
FIG. 2 is a simplified schematic diagram of the controller of the invention.

The air/fuel controller 38 of the invention is shown diagrammatically in FIG. 2. It receives signals from the oxygen sensors 30L and 30R, and from the temperature probes 32L, 32R, 34 and 36. The controller uses the input signals to generate left-bank and right-bank control signals on lines 40L and 40R, and an engine shutdown signal on line 42. As shown in the figure, the controller 38 has a control panel that includes separate liquid crystal displays (LCDs) for the left and right banks, separate mode switches to switch between a control mode and a monitor mode, and separate control buttons (L and R, for lean and rich) for changing an operating setpoint for engine bank operation.

Figure 3:
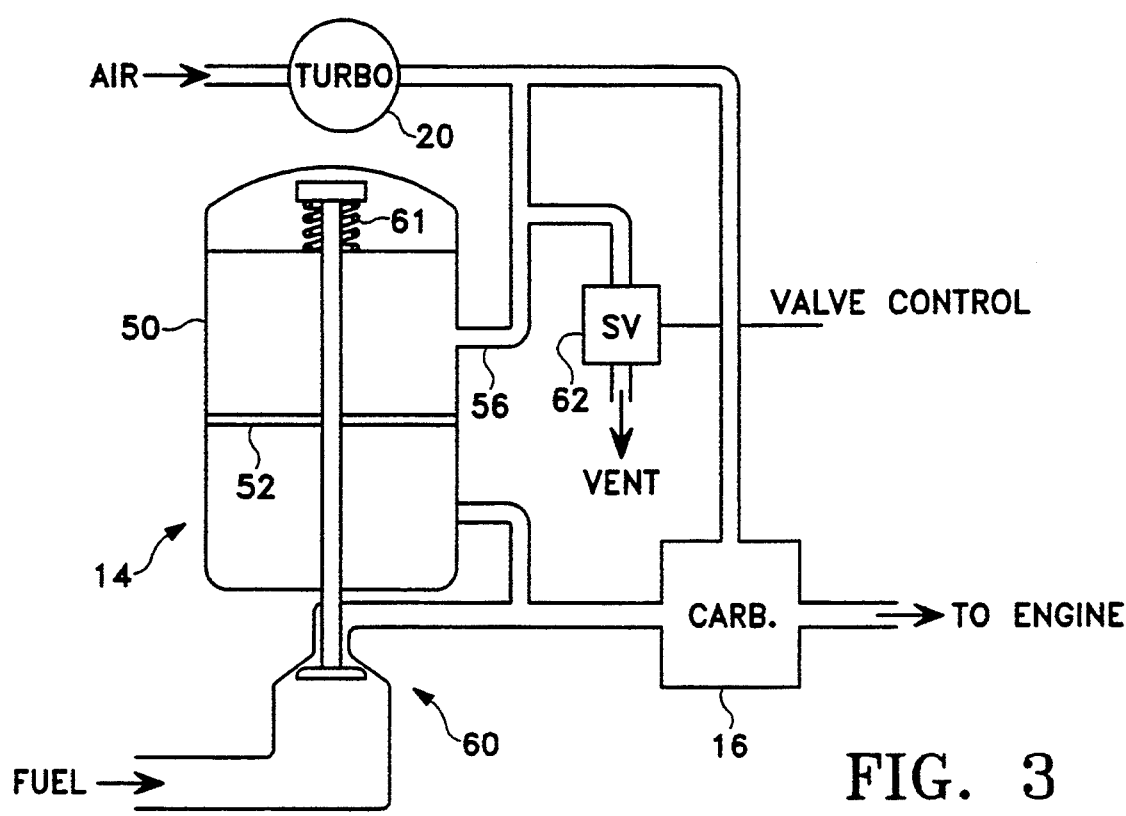
FIG. 3 is a simplified diagram showing how the invention interfaces with a conventional gas pressure regulator.

A key element of the invention is the simple and convenient approach used to control fuel pressure and flow by interfacing with the conventional fuel pressure regulators 14L and 14R. The specific regulator design is not critical to the invention and may be, for example, a Series 99 multi-purpose gas regulator or a Series $200 gas service regulator manufactured by Fisher Controls. These regulators and others of the same general type have a pressure chamber divided into two regions by a flexible diaphragm. This structure is shown diagrammatically in FIGS. 3 and 4. The pressure chamber is depicted at 50 and the diaphragm at 52. Gas pressure is introduced to one side of the diaphragm, as indicated at 54, and air pressure is introduced to the other, as indicated at 56. The diaphragm 52 is connected to a valve stem 58 that is part of a valve 60 in the gas line, and a spring 61 biases the diaphragm toward the closed position of the valve 60. If the air pressure applied on top of the diaphragm 42 increases, or if the gas pressure downstream of the valve 60 and applied beneath the diaphragm decreases, the diaphragm moves in a downward direction and further opens the valve. Since an increase in air pressure or a decrease in fuel pressure results in a leaner mixture, this downward movement of the diaphragm compensates by increasing the fuel flow to the engine and producing a richer mixture. Conversely, a lower air pressure, which would normally result in a richer mixture, tends to close the valve 60 and compensate by making the mixture leaner. In this manner, the regulator compensates for operation of the turbocharger 20 in a turbocharged engine, and compensates for atmospheric pressure changes in a naturally aspirated engine.

The pressure chamber port to which the air pressure is connected is referred to as a bias port, and the line connecting air pressure to this port is sometimes referred to as the balance line. In most air/fuel ratio controllers, control of the fuel flow is usually effected by tapping into the balance line and controllably venting the line to atmosphere, such as through a continuously variable orifice. Venting this line tends to lower the air pressure above the diaphragm 52 and close the fuel valve 60, thereby producing a more lean fuel/air mixture ratio.

In the air/fuel ratio controller of the present invention, expensive continuously variable valves or orifices are not used, and neither are stepper motors. Instead the balance line is vented through a simple solenoid-controlled valve 62. As applied to a turbocharged engine, the valve 62 either is closed, thereby applying the full turbocharged air pressure to the bias port of the regulator 14, or is open, in which condition the bias port is vented to atmosphere. As will be further described, a control signal applied to the valve 62 is duty-cycle modulated to provide a desired change to the fuel gas pressure. The controller functions to move the fuel valve 60 to a position that allows just enough fuel to be drawing into the engine to produce a desired oxygen concentration in the exhaust gas.

Figure 4:
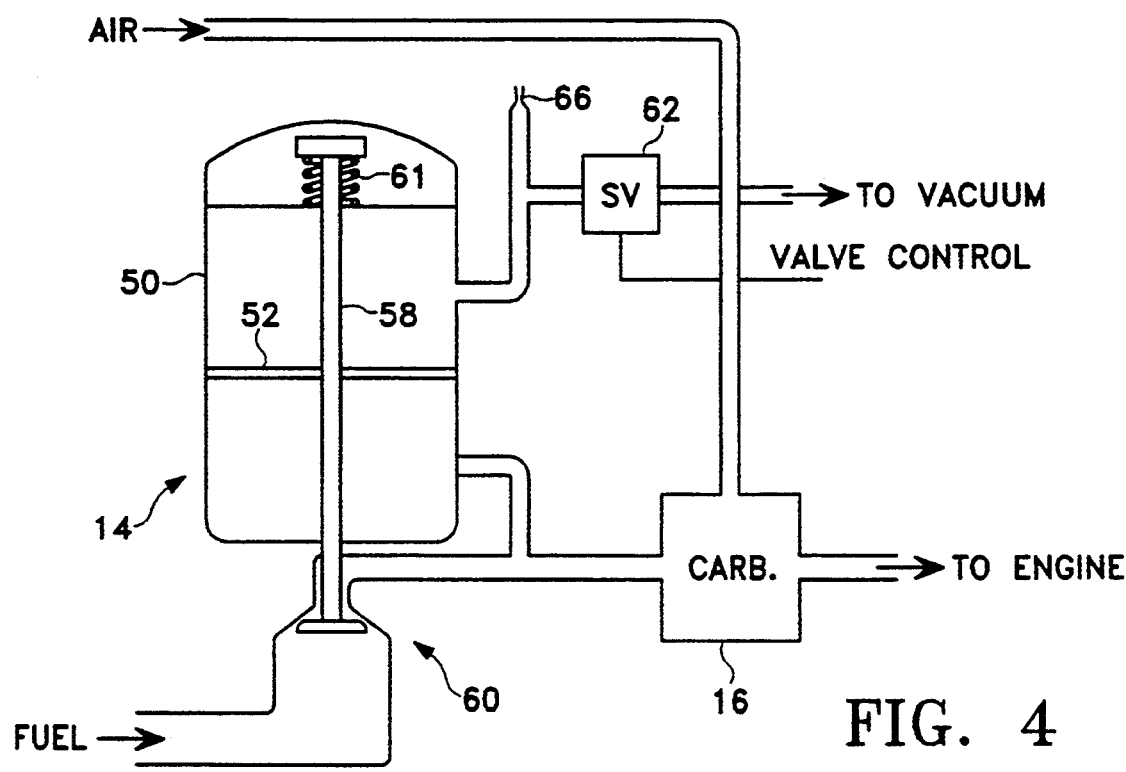
FIG. 4 is a figure similar to FIG. 3, but showing a similar arrangement for a naturally aspirated engine.

The invention is applied to a naturally aspirated engine in a slightly different way, as depicted in FIG. 4. The solenoid actuated valve 62 in this case vents the bias port to a vacuum line 64 connected to the intake manifold. With the valve 62 in the open condition, the bias port is vented, but to a vacuum source instead of to atmosphere. With the valve 62 closed, the bias port is connected to atmosphere, as is usually the case for naturally aspirated engines. In this configuration of the invention, a flow restrictor 66 is added at the opening to atmosphere, to restrict flow of atmospheric air when the valve 62 is open.

Although the invention operates in a binary fashion, either venting or not venting the bias port of the regulator 14, the result is to produce relatively gradual changes in fuel flow, and to maintain the fuel flow rate relatively constant when the engine load and other factors are unchanging. The mechanics of the regulator tend to filter the relatively rapid changes effected by the solenoid valve 62 and to produce slower changes in fuel flow rate.

Figure 5:
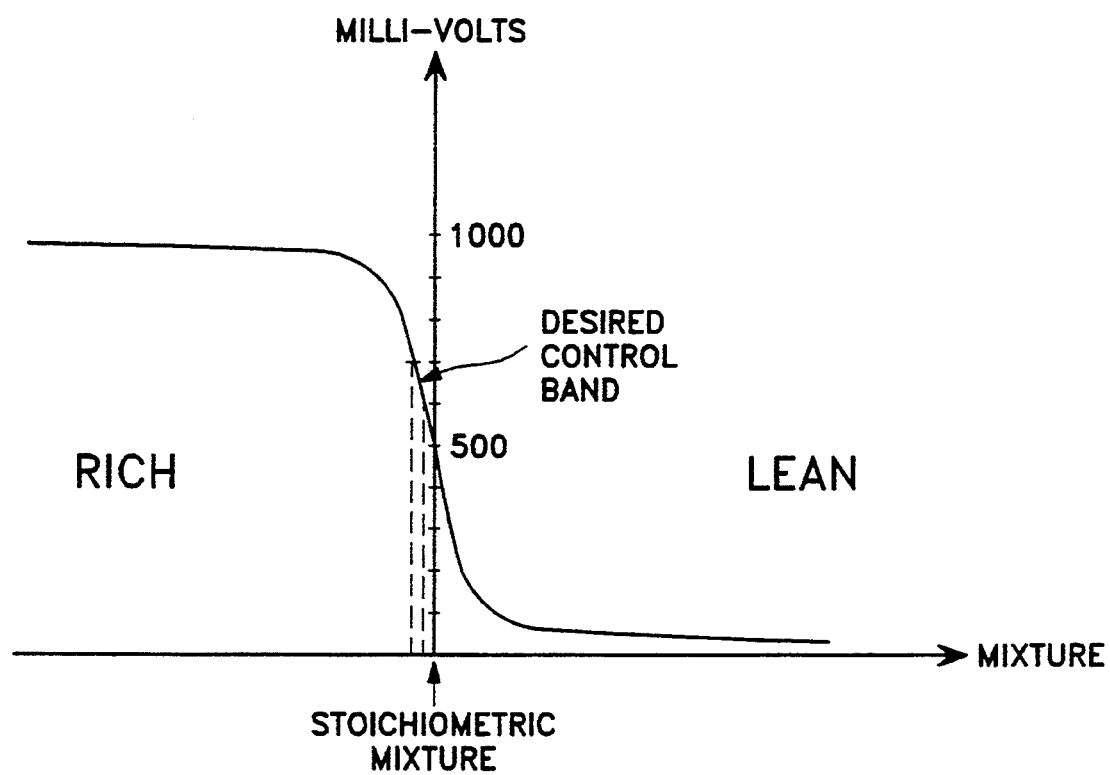
FIG. 5 is a graph plotting a typical characteristic response curve for an oxygen sensor.

The solenoid valves 62 receive control signals from the controller 38 as a result of a comparison between an oxygen setpoint value supplied by an operator, and the sensed oxygen concentration obtained from the sensors 30. A typical oxygen sensor characteristic is shown in FIG. 5, which plots the sensor output in millivolts (mv) along the vertical axis against air/fuel ratio along the horizontal axis. No scale is specified for the air/fuel ratio, but it varies from a rich ratio (i.e. an excess of fuel) on the left, to a lean ratio (i.e. an excess of air) on the right. The vertical or y axis is drawn at a point corresponding to the stoichiometric ratio, when just enough air is admitted to burn the fuel completely. From the standpoint of pollution control, the engine should be operated at or near the stoichiometric ratio. As illustrated, the sensor output varies from near zero for a very lean mixture to near 1,000 mv for a very rich mixture. In a region near the stoichiometric ratio, the sensor output varies in a nearly linear fashion with mixture. In the sensor illustrated, the desired or target control band for optimum pollution control is typically in the range 600–700 mv output.

In operation, the controller 38 reads the oxygen sensors 30 periodically and calculates an average sensor reading (for each cylinder bank) based on the last thirty readings. The average reading is compared with a setpoint value that is initially input or later modified by the operator. If the two values are the same to within a prescribed tolerance, no change is made to the control signals currently being transmitted to the solenoid valve 62. If the sensed oxygen level differs from the setpoint value by more that the prescribed tolerance, the controller may change the control signals transmitted to the solenoid valves, but only if the sensed oxygen level is within a prescribed range, such as 150 mv to 925 mv. Outside of this range, the oxygen level is probably not controllable using a linear control approach, and the control system is effectively disabled by closing the valve 62 and waiting for the oxygen level to return to the controllable range.

The control algorithm is linear; that is there is linear relationship between the error, i.e. the difference between the sensed oxygen level and the oxygen setpoint, and the correction applied to the solenoid valve control signal. The error value is simply multiplied by a constant and then applied as a correction, with an appropriate sign, to the proportion of time that the valve is open. If the oxygen error is positive, meaning a too-lean mixture, a negative correction is applied to the pulse width of the valve control signal. (Opening the valve leans the mixture, so a negative correction is needed to make the mixture less lean.) Conversely, if the oxygen error is negative, meaning a too-rich mixture, a positive correction is needed to make the mixture less rich.

Figure 6:
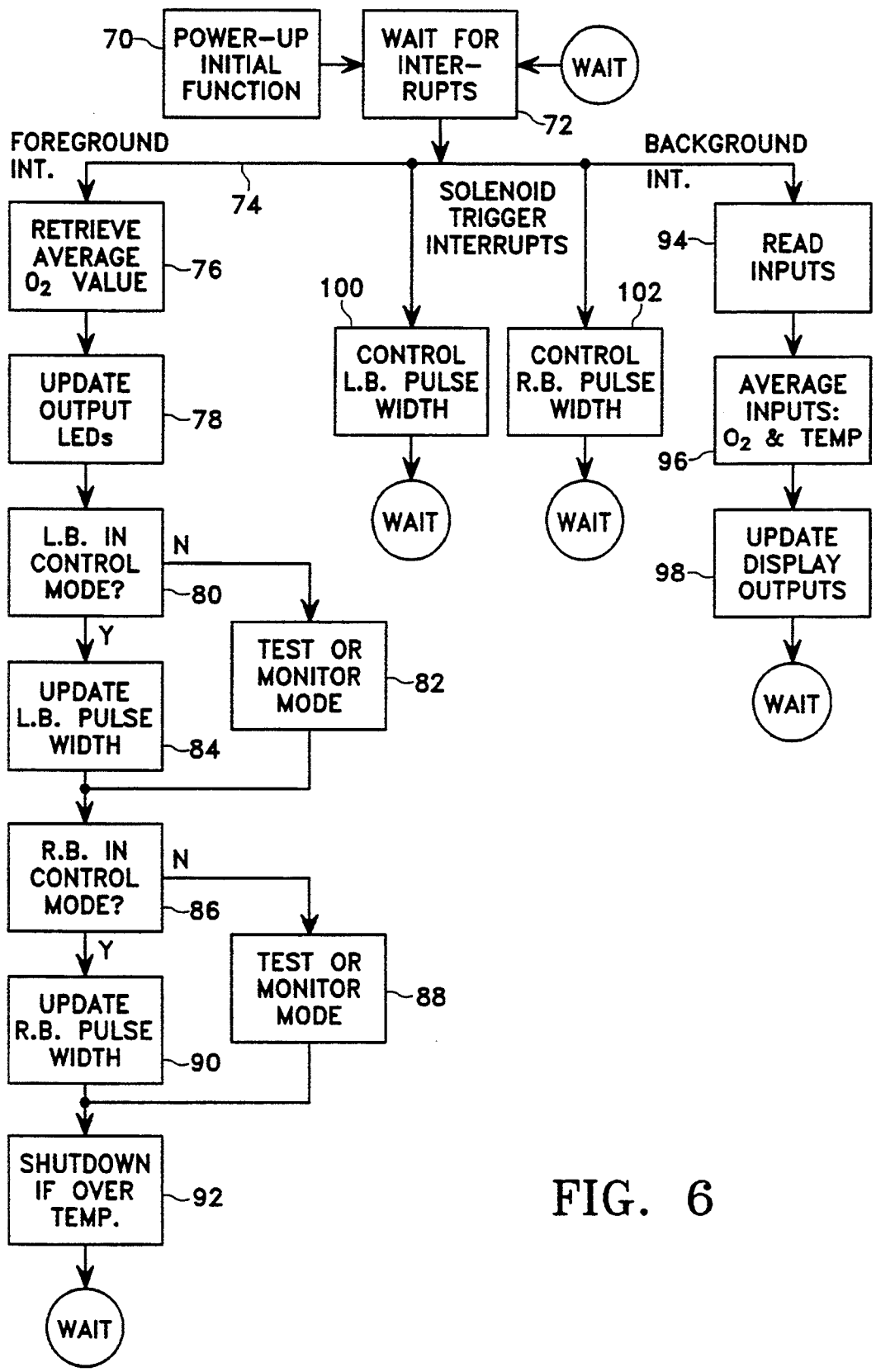
FIG. 6 is a flowchart depicting the principal functions performed by the controller of the present invention.

The controller functions are most conveniently implemented in the form of a programmed digital microprocessor, although it will be understood that the controller could also be implemented in the form of hardwired analog apparatus. The microprocessor used in the presently preferred embodiment is manufactured by Motorola Corporation and is designated Model 68HC1A1. Its functions will be further described in general terms, but it will be understood that any suitable microprocessor or computer may be readily programmed to perform the same functions. A flowchart of the principal microprocessor functions is given in FIG. 6.

When first switched on, the controller performs some initializing functions upon detecting a power-up condition, as indicated in block 70. Then the controller enters a wait state 72 in which it waits for the occurrence of an interrupt, all processing in the controller being interrupt driven. A real time clock provides timer interrupts every 32.77 milliseconds (ms) and these are processed as foreground or high priority interrupts, as indicated by the path 74. Basically, the foreground interrupt processing includes performing certain higher priority input-/output functions, and performing control functions on the solenoid valves 62. The principal functions performed in foreground processing include retrieving average oxygen values (block 76), and updating the status of output light emitting diodes (LEDs) on the control panel (block 78). Then the controller checks the mode selected for the left bank, as indicated in block 80. If the mode selected for the left bank is Test Mode or Monitor Mode, operation continues in the selected mode (block 82), but no control function is performed. The Test Mode allows the operator to control the mixture manually through the control panel of the controller. The Monitor Mode continues to monitor sensed temperatures but does not control the fuel regulator. If the Control Mode is selected for the left bank, the controller executes the control algorithm for the left bank, as indicated generally in block 84. Similar steps are performed for the right bank, as indicated in blocks 86, 88 and 90.

The controller shuts down the engine if the converter outlet temperature exceeds 1,350° F., as indicated in block 92. After making one pass through the foreground interrupt functions, the controller returns to the wait state 72.

The other interrupts that take the controller out of its wait state 72 are referred to as Output Compares. An Output Compare (OC) interrupt is generated by storing a selected count in an OC counter, which is then counted down at a 2 MHz clock rate. An interrupt is generated when the selected count value has been counted down. On OC counter is used to generate a background processing interrupt, at the same rate as the foreground real time clock. In background processing, the principal functions performed are reading inputs (block 94), averaging the input oxygen and temperature values (block 96), and updating the controller display outputs (block 98).

Other OC counters are used to generate solenoid trigger interrupts, which control the solenoid valve operations. Basically, the solenoid control signal pulse width (or ON time) is controlled by storing an appropriate count in an OC counter when the solenoid is turned on, and then turning it off in response to the resulting OC interrupt. As indicated generally in the flowchart, the solenoid trigger interrupts are processed by controlling the left bank solenoid pulse width (block 100) and the right bank solenoid pulse width (block 102).

Each solenoid valve is controllable to operate anywhere between a 0% and a 100% duty cycle. A complete cycle of solenoid valve operation takes four real time clock cycles, i.e. 4×32.77 or 131.08 ms. Because the OC counters are only sixteen bits in length, they have to be set more than once in succession to achieve the 100% duty cycle. Sixteen bits are equivalent to 65,535 counts, which is equivalent to 32.77 ms at the 2 MHz clock rate. Every four real time clock cycles, the solenoid valves are turned on. The time at which they are turned off is determined by the count stored at that time in the appropriate OC counter. After counting down once, the count is restored to the counter for a second, third and fourth time. Interrupt service routines wait for the fourth interrupt after the solenoid valve was turned on, and then turn the valve off. The smallest count stored in the OC counters for this purpose is a value of 100. Four OC interrupts resulting from this count value produce a valve open time of 200 μs, which is too short a time for the solenoid to react, and is therefore equivalent to virtually a zero duty cycle.

During the first pass of the control algorithm, the duty cycle of each solenoid valve is initialized to a value of 100, the minimum duty cycle value, corresponding to a near-zero duty cycle. In this initial condition, the solenoid valve is not opened at all and the engine tends to run rich. On subsequent passes, the current duty cycle value is corrected in proportion to an oxygen error value, given by:

Error=(Setpoint Value)−(Average Sensed O$_2$ Value).

Then a Change value is computed from:

Change = Error × KDUTY, where KDUTY = 3.
Then the current duty cycle value, DUTY, is updated to:

DUTY(new) = DUTY − Change.

The minus sign in this expression is intended to indicate that, if the Error is negative, the magnitude of Change is added to current DUTY value, and if the Error is positive, the magnitude of the Change is subtracted from the current DUTY value.

The foregoing control algorithm is performed only if: (1) the magnitude of the Error is 3 or more, and (2) the sensed $O_2$ level is within the range 150 mv to 925 mv.

The setpoint value of oxygen level for each bank is set or changed by the operator, simply by pressing the left-bank or right-bank "leaner" or "richer" buttons on the control panel. First pressing one of the buttons results in display of the setpoint value. Holding a button down for longer than a second results in changing the setpoint value.

Temperature values sensed by the controller are used in conjunction with preselected thresholds to disable controller operation. The converter outlet temperature is used to actuate a warning function if the temperature reaches 1,300° F. and a shutdown function if the temperature reaches 1,350° F. Temperature readings taken in the exhaust manifolds are used only to qualify the oxygen readings, which are of no significance if the temperature is below 650° F.

A further refinement to the control algorithm derives a trend in the oxygen level and uses this to defer making any further changes to the duty cycle. The oxygen readings are averaged over the thirty most recent samples and the resulting average value is used in the control algorithm. To determine a trend, the controller also computes an average over the last five samples. Suppose, for example that the controller derives a duty cycle correction of some positive value, to be added to the current duty cycle, to make the engine run leaner than its current setting. If the five-sample average indicates that the oxygen level is already moving in the right direction, i.e. in this example, indicates that the oxygen level in the exhaust is increasing, then a further correction might be deferred until some future time. If a later computation indicates that the five-sample average is substantially the same as the thirty-sample average, then a correction should be made if there is still a difference between the average sensed oxygen level and the setpoint value.

It will be appreciated from the foregoing that the present invention represents a significant advance in the field of air/fuel ratio controllers for large industrial engines, particularly gas engines. In particular, the invention provides a simple but effective technique for regulating the flow of fuel to provide a desired oxygen level, and therefore a desired balance of pollutant levels, in the exhaust gases emitted from the engine. The invention independently controls fuel pressure regulators for each of two cylinder banks in the engine. A key feature of the invention is that a conventional fuel regulator can be effectively controlled without the need for proportional controllers or stepper motor valves, but using only a simple solenoid valve that is duty-cycle modulated to maintain a desired oxygen level in the exhaust manifold of each cylinder bank. It will also be appreciated that, although an embodiment of the invention has been described in detail for purposes of illustration, various modifications may be made without departing from the spirit and scope of the invention. Accordingly, the scope of the invention should not be limited except as by the appended claims.

We claim:

1. Air/fuel ratio control apparatus for use with an engine having multiple cylinders with intake and exhaust manifolds, the apparatus comprising:
   an air/fuel mixer having an air inlet and a fuel inlet;
   a fuel pressure regulator, for controlling the fuel pressure supplied to the fuel inlet of the mixer, in response to pressure changes in an air chamber of the regulator;
   a solenoid valve coupled to the fuel pressure regulator, wherein opening the solenoid valve vents the air chamber and results in a lower fuel pressure supplied to the fuel inlet of the air/fuel mixer;
   an oxygen sensor installed in the exhaust manifold, for generating a signal indicative of the oxygen level in the exhaust manifold; and
   a controller having means for inputting a desired oxygen setpoint value, the controller being responsive to the signals indicative of the oxygen level, and means for generating a solenoid valve control signal, wherein the control signal is adjusted in pulse width to control the fuel pressure and flow to achieve the desired oxygen setpoint value.

2. Apparatus as defined in claim 1, wherein the controller further includes:
   means for periodically reading the signals indicative of the oxygen level;
   means for averaging a selected number of consecutive oxygen signals, to obtain an average sensed oxygen level;
   means for comparing the averaged sensed oxygen level with the oxygen setpoint value and generating an error value from the comparison; and
   means for applying a correction value, corresponding to the error value, to a duty value indicative of the pulse width of the solenoid valve control signal, whereby the pulse width of the control signal is changed in response to the difference between the averaged sensed oxygen level and the oxygen setpoint value;
   and wherein the means for generating a solenoid valve control signal uses the duty value to set the pulse width of the control signal.

3. Apparatus as defined in claim 1, wherein:
   the engine is turbocharged and has a turbocharger connected to the air inlet of the air/fuel mixer;
   the fuel pressure regulator has a bias port in its air chamber, connected by a line to the outlet side of the turbocharger; and
   the solenoid valve is connected to vent the line between the bias port and the outlet side of the turbocharger;
   wherein application of the solenoid valve control signal opens the valve, vents the air chamber of the regulator, and results in leaner operation of the engine.

4. Apparatus as defined in claim 1, wherein:
   the engine is naturally aspirated;

the fuel pressure regulator has a bias port in its air chamber, normally coupled to atmospheric pressure; and the solenoid valve is connected to vent the bias port to a source of vacuum;

wherein application of the solenoid valve control signal opens the valve, vents the air chamber of the regulator, and results in leaner operation of the engine.

5. Apparatus as defined in claim 4, wherein:

the bias port is connected to atmosphere through an air line and a flow restrictor; and the solenoid valve is connected to the air line between the bias port and the flow restrictor, whereby when the valve is open to vent the air chamber only a small amount of atmospheric air is drawn in through the flow restrictor, and when the valve is closed the air chamber is connected to atmosphere through the flow restrictor.

6. Air/fuel ratio control apparatus for use with an engine having at least two banks of cylinders with separate intake and exhaust manifolds, the apparatus comprising:

an air/fuel mixer for each bank of cylinders, the mixer having an air inlet and a fuel inlet;

a fuel pressure regulator for each bank of cylinders, for controlling the fuel pressure supplied to the fuel inlet of the mixer, in response to pressure changes in an air chamber of the regulator;

a solenoid valve coupled to each fuel pressure regulator, wherein opening the solenoid valve vents the air chamber and results in a lower fuel pressure supplied to the fuel inlet of the air/fuel mixer;

an oxygen sensor installed in the exhaust manifold of each cylinder bank, for generating a signal indicative of the oxygen level in the exhaust manifold; and a controller having means for inputting a desired oxygen setpoint value for each cylinder bank, the controller being responsive to the signals indicative of the oxygen level, and means for generating a solenoid valve control signal for each cylinder bank, wherein the control signal is adjusted in pulse width to control the fuel pressure and flow to achieve the desired oxygen setpoint value.

7. Apparatus as defined in claim 6, wherein the controller further includes:

means for periodically reading the signals indicative of the oxygen level;

means for averaging a selected number of consecutive oxygen signals, to obtain an average sensed oxygen level for each cylinder bank;

means for comparing the averaged sensed oxygen level for each cylinder bank with the oxygen setpoint value for the same cylinder bank and generating an error value from the comparison; and means for applying a correction value, corresponding to each error value, to a duty value indicative of the pulse width of the solenoid valve control signal for each cylinder bank, whereby the pulse width of the control signal is changed in response to the difference between the averaged sensed oxygen level and the oxygen setpoint value;

and wherein the means for generating a solenoid valve control signal uses the duty value to set the pulse width of the control signal.

8. Apparatus as defined in claim 6, wherein:

the engine is turbocharged and has a turbocharger connected to the air inlet of the air/fuel mixer for each cylinder bank;

the fuel pressure regulator has a bias port in its air chamber, connected by a line to the outlet side of the turbocharger; and the solenoid valve is connected to vent the line between the bias port and the outlet side of the turbocharger;

wherein application of the solenoid valve control signal opens the valve, vents the air chamber of the regulator, and results in leaner operation of the engine.

9. Apparatus as defined in claim 6, wherein:

the engine is naturally aspirated;

the fuel pressure regulator has a bias port in its air chamber, normally coupled to atmospheric pressure; and the solenoid valve is connected to vent the bias port to a source of vacuum;

wherein application of the solenoid valve control signal opens the valve, vents the air chamber of the regulator, and results in leaner operation of the engine.

10. Apparatus as defined in claim 9, wherein:

the bias port is connected to atmosphere through an air line and a flow restrictor; and the solenoid valve is connected to the air line between the bias port and the flow restrictor, whereby when the valve is open to vent the air chamber only a small amount of atmospheric air is drawn in through the flow restrictor, and when the valve is closed the air chamber is connected to atmosphere through the flow restrictor.

11. A method for controlling the air/fuel ratio in an industrial natural gas engine having multiple cylinders with intake and exhaust manifolds, the method comprising:

selecting a desired setpoint oxygen level for the exhaust manifold, the setpoint level being selected to provide a desired level of pollutants in the exhaust;

sensing the oxygen level in the exhaust manifold;

generating a binary fuel control signal, derived from the setpoint oxygen level and the sensed oxygen level; and applying the binary fuel control signal to a fuel control valve to regulate the flow of fuel;

wherein the fuel control valve is a solenoid valve coupled to a fuel pressure regulator and the step of applying the binary fuel control signal includes opening and closing the solenoid valve to selectively vent an air chamber in the fuel pressure regulator, for indirect control of fuel pressure;

and wherein the fuel control valve in an on condition serves to reduce the flow of fuel to the engine, and repeated opening and closing of the solenoid valve by the fuel control signal results in adjustment of the air/fuel ratio to conform the sensed oxygen level to the setpoint oxygen level.

12. A method as defined in claim 11, wherein the step of generating a binary fuel control signal includes:

computing an oxygen level error based on a comparison of the setpoint oxygen level and the sensed oxygen level;

deriving a fuel control correction from the oxygen level error; and applying the fuel control correction to a current value of a fuel control parameter, wherein the fuel control parameter is indicative of the proportion of time that the fuel control valve is to remain in an on condition.

13. A method as defined in claim 12, wherein the step of generating a binary fuel control signal further includes:
- periodically generating an on signal for applying to the fuel control valve;
- waiting for a time proportional to the current fuel control parameter, after generation of each on signal; and then
- generating an off signal for applying to the fuel control valve.

14. A method for controlling the air/fuel ratio in an industrial natural gas engine having at least two banks of cylinders with separate intake and exhaust manifolds, the method comprising:
- selecting a desired setpoint oxygen level for each of the exhaust manifolds, the setpoint levels being selected to provide a desired level of pollutants in the exhaust;
- sensing the oxygen level in each of the exhaust manifolds;
- generating for each cylinder bank a binary fuel control signal, derived from the setpoint oxygen level and the sensed oxygen level; and
- applying the binary fuel control signal to a fuel control valve to regulate the flow of fuel;
- wherein the fuel control valve is a solenoid valve coupled to a fuel pressure regulator and the step of applying the binary fuel control signal includes opening and closing the solenoid valve to selectively vent an air chamber in the fuel pressure regulator, for indirect control of fuel pressure;
- and wherein the fuel control valve in an on condition serves to reduce the flow of fuel to the engine, and repeated opening and closing of the valve by the fuel control signal results in adjustment of the air/fuel ratio to conform the sensed oxygen level to the setpoint oxygen level for each cylinder bank.

15. A method as defined in claim 14, wherein the step of generating a binary fuel control signal includes:
- computing an oxygen level error based on a comparison of the setpoint oxygen level and the sensed oxygen level;
- deriving a fuel control correction from the oxygen level error; and
- applying the fuel control correction to a current value of a fuel control parameter, wherein the fuel control parameter is indicative of the proportion of time that the fuel control valve is to remain in an on condition.

16. A method as defined in claim 15, wherein the step of generating a binary fuel control signal further includes:
- periodically generating an on signal for applying to the fuel control valve;
- waiting for a time proportional to the current fuel control parameter, after generation of each on signal; and then
- generating an off signal for applying to the fuel control valve.

17. An air/fuel ratio controller for use with an industrial natural gas engine having multiple cylinders, intake and exhaust manifolds, an air/fuel mixer, and a fuel control valve, the controller comprising:
- at least one input circuit, for inputting signals indicative of sensed oxygen level in the exhaust manifold;
- a control panel, including means for inputting a desired oxygen setpoint value;
- means for generating a binary fuel control signal having periodic pulses with a controllable pulse width;
- means for periodically deriving a pulse width correction from the difference between the sensed oxygen level and the oxygen setpoint value;
- means for periodically applying the correction to the pulse width; and
- an electrically operated valve coupled to a fuel pressure regulator and connected to receive the binary fuel control signal, for selectively venting the pressure regulator in accordance with the binary fuel control signal and thereby indirectly controlling fuel pressure and flow;
- wherein the generated binary fuel control signal effects a change in air/fuel ratio, which tends to move the sensed oxygen level closer to the oxygen setpoint value.

18. A controller as defined in claim 17, and further comprising:
- an additional input circuit, for inputting signals indicative of temperature; and
- means for discontinuing operation of the controller if the temperature signals are not within a prescribed range.

19. A controller as defined in claim 18, wherein the means for discontinuing operation of the controller include:
- means for disabling the generation of the binary fuel control signal if the temperature in the exhaust manifold is below a selected threshold.

20. A controller as defined in claim 18, wherein the means for discontinuing operation of the controller include:
- means for disabling the generation of the binary fuel control signal if the temperature of a selected engine component exceeds a selected threshold.

21. A controller as defined in claim 17, and further comprising:
- means for averaging a selected number of consecutive sensed oxygen readings, to obtain an average sensed oxygen level for use in deriving a pulse width correction.

22. A controller as defined in claim 21, and further comprising:
- means for deriving a trend in the sensed oxygen level, from a number of consecutive sensed oxygen readings;
- means for selectively disabling the application of a pulse width correction, based on the derived trend in the sensed oxygen level.

23. A controller as defined in claim 17, wherein:
- the controller includes a microprocessor; and
- the means for inputting a desired setpoint value includes a pair of control buttons to initiate display and modification of the setpoint value.

24. A controller as defined in claim 23, wherein the controller further comprises:
- at least one additional input circuit, for inputting signals indicative of sensed oxygen level in a separate exhaust manifold serving a separate bank of cylinders in the engine;
- means for generating a separate binary fuel control signal for controlling fuel separately supplied to the separate bank of cylinders;

means for deriving a pulse width correction from the difference between the sensed oxygen level in the separate bank of cylinders and a separate oxygen setpoint value; and means for periodically applying the correction to the pulse width of the separate binary fuel control signal;

wherein at least two cylinder banks of the engine can be controlled independently to achieve different target oxygen output levels.

* * * * *